United States Patent
Miwa et al.

(10) Patent No.: US 12,403,710 B2
(45) Date of Patent: Sep. 2, 2025

(54) PRETREATMENT APPARATUS, PRETREATMENT METHOD, PRODUCING METHOD, AND AQUEOUS SOLUTION

(71) Applicant: BROTHER KOGYO KABUSHIKI KAISHA, Nagoya (JP)

(72) Inventors: Takuya Miwa, Nagoya (JP); Mami Murase, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 100 days.

(21) Appl. No.: 18/023,921

(22) PCT Filed: Dec. 21, 2021

(86) PCT No.: PCT/JP2021/047231
§ 371 (c)(1),
(2) Date: Feb. 28, 2023

(87) PCT Pub. No.: WO2022/145282
PCT Pub. Date: Jul. 7, 2022

(65) Prior Publication Data
US 2023/0322006 A1  Oct. 12, 2023

(30) Foreign Application Priority Data
Dec. 28, 2020  (JP) ................. 2020-219238

(51) Int. Cl.
*B41J 2/01*  (2006.01)
*B41M 5/00*  (2006.01)
(Continued)

(52) U.S. Cl.
CPC ......... *B41M 5/0017* (2013.01); *C09D 11/037* (2013.01); *C09D 11/14* (2013.01);
(Continued)

(58) Field of Classification Search
CPC .... B41M 5/0017; C09D 11/037; C09D 11/14; C09D 11/54; D06P 1/48; D06P 5/002; D06P 5/30; B41J 2/01
See application file for complete search history.

(56) References Cited

U.S. PATENT DOCUMENTS

2017/0210941 A1  7/2017  Wakabayashi

FOREIGN PATENT DOCUMENTS

| EP | 3101069 A1 | 12/2016 |
|---|---|---|
| EP | 3299516 | 3/2018 |

(Continued)

OTHER PUBLICATIONS

Office Action issued in corresponding Japanese patent application No. 2020-219238, dated Oct. 29, 2024. (4 pages.).

(Continued)

*Primary Examiner* — Jason S Uhlenhake
(74) *Attorney, Agent, or Firm* — K&L Gates LLP

(57) ABSTRACT

A pretreatment apparatus of the present disclosure is a pretreatment apparatus configured to perform pretreatment on a recording medium having permeability and to be applied with ink, including: a first applicator configured to apply an aqueous solution containing alginate to the recording medium; a second applicator configured to apply an aqueous solution containing a chelating agent to the recording medium; and a third applicator configured to apply a pretreatment agent containing a polyvalent metal salt to the recording medium, wherein the third applicator is configured to apply the pretreatment agent after the application of the aqueous solutions by the first applicator and the second applicator.

7 Claims, 5 Drawing Sheets

(51) Int. Cl.
*C09D 11/037* (2014.01)
*C09D 11/14* (2006.01)
*C09D 11/38* (2014.01)
*C09D 11/54* (2014.01)
*D06P 1/48* (2006.01)
*D06P 5/00* (2006.01)
*D06P 5/30* (2006.01)

(52) U.S. Cl.
CPC .............. *C09D 11/38* (2013.01); *C09D 11/54* (2013.01); *D06P 1/48* (2013.01); *D06P 5/002* (2013.01); *D06P 5/30* (2013.01)

(56) References Cited

FOREIGN PATENT DOCUMENTS

| | | |
|---|---|---|
| JP | 2007-230080 | 9/2007 |
| JP | 2006-124842 | 10/2011 |
| JP | 2017-132048 | 8/2017 |
| JP | 2018-048244 | 3/2018 |
| JP | 2020100008 A * | 7/2020 |
| WO | WO-2015115614 A1 * | 8/2015 ........... C09D 11/102 |

OTHER PUBLICATIONS

International Search Report issued to PCT/JP2021/047231, dated Mar. 22, 2022, 7 pages.
Written Opinion issued in related International Patent Application No. PCT/JP2021/047231, dated Mar. 22, 2022. (4 pages.).

* cited by examiner (A)

PPT1
Alginate Na 1%

(B)

PPT2
Alginate Na 1% + EDTA4Na4 hydrate 1%

(C)

PPT3
Alginate Na 1% + 3Na2 citrate hydrate 1%

(D)

PPT4
Alginate Na 1% + 3Na2 citrate hydrate 3%

(A) PPT5 — Ref. No chelating agent
(B) PPT6 — EDTA4Na4 hydrate 1%
(C) PPT7 — 3Na2 citrate hydrate 1%

(D) PPT8 — EDTA4Na4 hydrate 5%
(E) PPT9 — 3Na2 citrate hydrate 5%

PRETREATMENT APPARATUS, PRETREATMENT METHOD, PRODUCING METHOD, AND AQUEOUS SOLUTION

REFERENCE TO RELATED APPLICATIONS

This application is a continuation of PCT application number PCT/JP2021/047231, filed on Dec. 21, 2021, which claims priority from Japanese Patent Application No. 2020-219238 filed on Dec. 28, 2020. The entire content of the priority application is incorporated herein by reference.

BACKGROUND ART

In printing an image by an ink-jet method, known is a pretreatment method of ejecting a pretreatment agent (hereinafter, also referred to as a PT) in advance to an image printing area in order to improve image quality or the like. However, bleeding of the PT to outside the printing area sometimes occurs.

In order to improve the bleeding, disclosed is a technique of further applying a pre-pretreatment agent (hereinafter, also referred to as a PPT), and then applying the PT.

DESCRIPTION

The inventors have found that, when an aqueous solution containing alginate is used as the PPT, alginate contained in the PPT and calcium ion contained in the PT are gelated, and thus a trace of gelation is left.

With the foregoing in mind, it is an object of the present disclosure to provide a pretreatment apparatus, a pretreatment method, a producing method, and an aqueous solution reducing bleeding of the pretreatment agent (PT) and reduces the trace of the pretreatment caused by the reaction between the pretreatment agent (PPT) and the PT.

In order to achieve the aforementioned object, the present disclosure provides a pretreatment apparatus configured to perform pretreatment on a recording medium having permeability and to be applied with ink, including:
 a first applicator configured to apply an aqueous solution containing alginate to the recording medium;
 a second applicator configured to apply an aqueous solution containing a chelating agent to the recording medium; and
 a third applicator configured to apply a pretreatment agent containing a polyvalent metal salt to the recording medium, wherein
 the third applicator is configured to apply the pretreatment agent after the application of the aqueous solutions by the first applicator and the second applicator.

The present disclosure also provides a pretreatment method for performing pretreatment on a recording medium having permeability and to be applied with ink, including:
 a first application step of applying an aqueous solution containing alginate to the recording medium;
 a second application step of applying an aqueous solution containing a chelating agent to the recording medium; and
 a third application step of applying a pretreatment agent containing a polyvalent metal salt to the recording medium, wherein
 the pretreatment agent is applied by the third application step after the application of the aqueous solutions by the first application step and the second application step.

The present disclosure also provides a method for producing a recording medium applied with pretreatment, including:
 a pretreatment step of performing pretreatment on the recording medium, wherein the pretreatment step is performed by the pretreatment method according to the present disclosure.

The present disclosure also provides an aqueous solution to be supplied to a pretreatment apparatus configured to perform pretreatment, on a recording medium having permeability and to be applied with ink, in order of an aqueous solution containing alginate and a pretreatment agent containing a polyvalent metal salt, wherein
 the aqueous solution further contains a chelating agent.

The present disclosure provides a pretreatment apparatus reducing bleeding of the pretreatment agent (PT) and reduces the trace of the pretreatment caused by the reaction between the pretreatment agent (PPT) and the PT.

Figure 1:
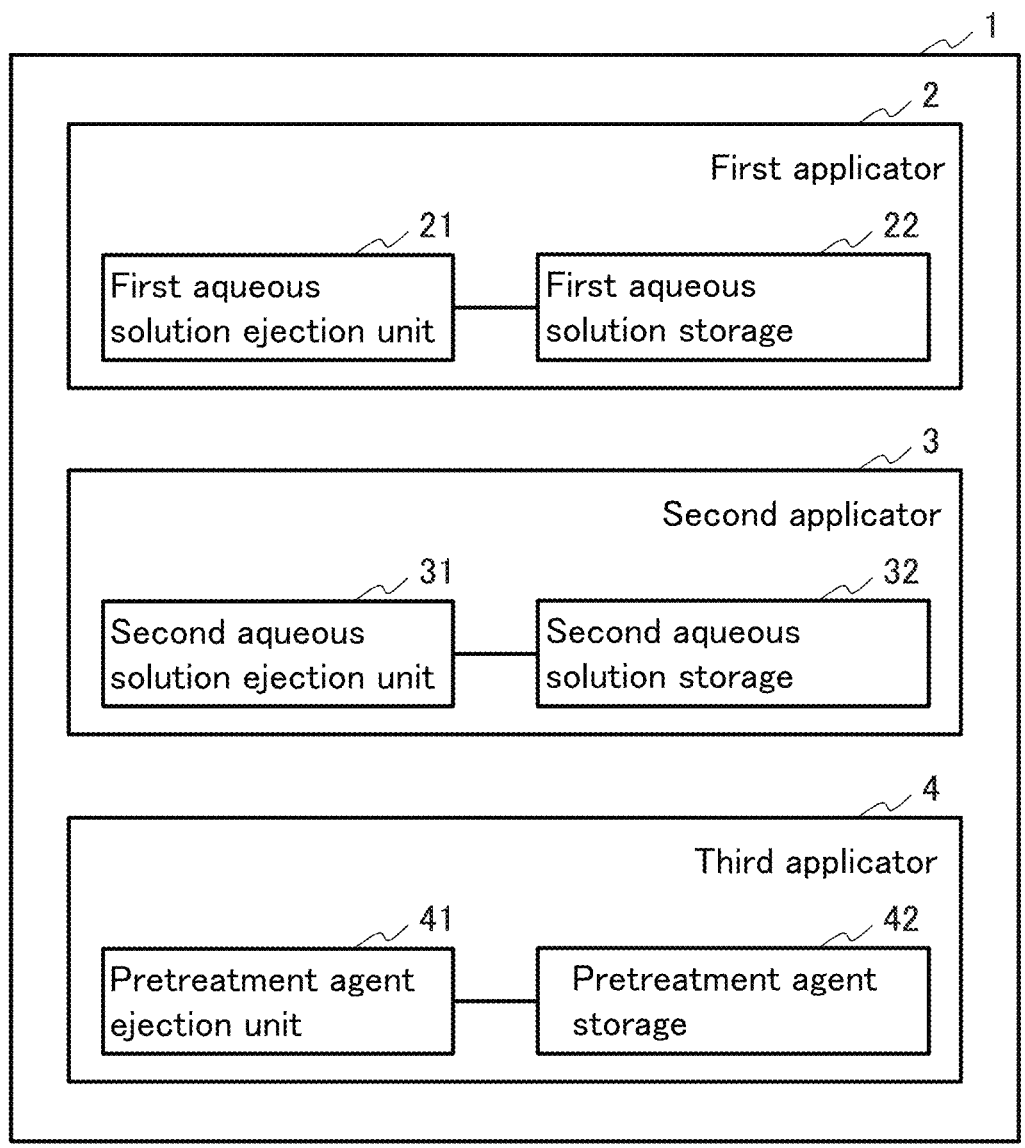
FIG. 1 is a schematic diagram illustrating a configuration of an example of a pretreatment apparatus of the present disclosure.

The aqueous solution containing alginate, the aqueous solution containing a chelating agent, the pretreatment agent containing a polyvalent metal salt, the ink, and the recording medium in the present disclosure are described below.

The aqueous solution containing alginate contains alginate. Other configuration of the aqueous solution containing alginate is not particularly limited.

The alginate may be, for example, sodium alginate. However, the alginate is not limited to sodium alginate, and a water-soluble salt such as potassium alginate, ammonium alginate, or the like may be used, for example.

The alginate concentration in the aqueous solution containing the alginate is not particularly limited as long as it exerts an effect as a pre-pretreatment agent, and is, for example, 0.5 mass % to 15 mass %, and is 1 mass %.

The aqueous solution containing a chelating agent contains a chelating agent. Other configuration of the aqueous solution containing a chelating agent is not particularly limited.

The chelating agent may be EDTA4Na4 hydrate and 3Na2 citrate hydrate. However, the chelating agent is not limited thereto, and examples thereof include ethylenediamine tetraacetic acid (EDTA), nitrilo triacetic acid (NTA), diethylene triamine pentaacetic acid (DTPA), hydroxyethyl ethylene diamine triacetic acid (HEDTA), triethylene tetramine hexaacetic acid (TTHA), 1,3-propanediamine tetraacetic acid (PDTA), 1,3-diamino-2-hydroxypropane tetraacetic acid (DPTA-OH), hydroxyethyl imino diacetic acid (HIDA), dihydroxyethyl glycine (DHEG), glycol ether diamine tetraacetic acid (GE DTA), dicarboxymethyl glutamic acid (CMGA), (S,S)-ethylene diamine disuccinic acid (EDDS), aminocarboxylic acid chelating agents such as hydroxyiminodisuccinic acid (HIDS) and the like; phosphonic acid chelating agents such as hydroxyethylidene diphosphonic acid (HEDP), nitrilotris(methylene phosphonic acid) (NTMP), phosphonobutane tricarboxylic acid (PBTC), ethylene diamine tetra(methylene phosphonic acid) (EDTMP), and the like; and other chelating agents such as L-aspartate-N,N-diacetic acid tetrasodium salt (ASDA), gluconic acid, citric acid, malic acid, and the like. In the following description, "sodium" is also referred to as "Na".

In the aqueous solution containing the chelating agent, the chelating agent concentration is, for example, 5% or less and 1% or more. The chelating agent concentration may be, for example, 1%, 3%, or 5%.

The pretreatment agent containing a polyvalent metal salt contains a polyvalent metal salt. Other configuration of the pretreatment agent containing a polyvalent metal salt is not particularly limited.

The polyvalent metal salt may be, for example, calcium nitrate dihydrate. However, the polyvalent metal salt is not limited thereto, and water-soluble salts of magnesium, calcium, strontium, barium, aluminum, copper, iron, nickel, and zinc may be used, and water-soluble salts of magnesium and calcium may be used.

The ink may be an ink for use in ink application by a general ink-jet method, and is not particularly limited. The ink may contain, for example, a pigment, a dye, and the like as a coloring agent. Further, the ink may contain, for example, a resin such as a urethane resin, an acrylic resin, or the like. The ink may further contain, for example, water, as well as other components such as a humectant and a surfactant.

The recording medium has permeability. Other configuration of the recording medium is not particularly limited. Examples of the recording medium having permeability include fabric, paper, corrugated board, ceramics, nonwoven fabric, sponge, and metal mesh. The recording medium having permeability is made of, for example, a porous material.

Pretreatment Apparatus

A pretreatment apparatus of the present disclosure is described below. The pretreatment apparatus of the present disclosure may be an integral-type apparatus including a first applicator, a second applicator, and a third applicator inside one casing or a system independently including the first applicator, the second applicator, and the third applicator.

FIG. 1 shows an example of the configuration of the pretreatment apparatus of the present disclosure. As shown in FIG. 1, the pretreatment apparatus 1 includes a first applicator 2, a second applicator 3, a third applicator 4, and a controller. In the pretreatment apparatus 1, the controller is an optional component, and the pretreatment apparatus 1 may or may not include the controller, for example. The pretreatment apparatus 1 may have, for example, the same configuration as a general ink-jet type image forming apparatus.

The first applicator 2 is configured to apply the aqueous solution containing the alginate to the recording medium. The first applicator 2 includes a first aqueous solution ejection unit 21 and a first aqueous solution storage 22.

The first aqueous solution ejection unit 21 may be a spray. However, the present disclosure is not limited thereto, and the first aqueous solution ejection unit 21 may be any unit as long as the aqueous solution containing the alginate is ejected onto the recording medium, and may be, for example, a liquid ejection head having an ink-jet nozzle line, a stamp, a brush, a roller, or the like for use in applying an ink to a fabric.

The first aqueous solution storage 22 contains the aqueous solution containing the alginate. In the first aqueous solution storage 22, a storage container such as a cartridge or a tank is connected to the first aqueous solution ejection unit 21 via a supply tube.

The second applicator 3 is configured to apply an aqueous solution containing the chelating agent to the recording medium. The second applicator 3 includes a second aqueous solution ejection unit 31 and a second aqueous solution storage 32.

The second aqueous solution ejection unit 31 is the same as the first aqueous solution ejection unit 21.

The second aqueous solution storage 32 contains the aqueous solution containing the chelating agent. In the second aqueous solution storage 32, a storage container such as a cartridge or a tank is connected to the second aqueous solution ejection unit 31 via a supply tube.

In FIG. 1, the second applicator 3 is provided separately from the first applicator 2. However, the present disclosure is not limited thereto, and in the pretreatment apparatus 1, the first applicator 2 may also serve as the second applicator 3, and the first applicator 2 may apply an aqueous solution containing the alginate and the chelating agent to the recording medium. In the case of having the aforementioned configuration, the first aqueous solution storage 22 may contain the aqueous solution containing the alginate and the chelating agent, or the first aqueous solution storage 22 and the second aqueous solution storage 32 may contain the aqueous solution containing the alginate and the aqueous solution containing the chelating agent, respectively. In the former case, by using the aqueous solution containing both the alginate and the chelating agent, for example, the aqueous solution containing the chelating agent and the aqueous solution containing the alginate are uniformly dispersed in the aqueous solution, so that gelation is suppressed uniformly.

The third applicator 4 is configured to apply the pretreatment agent containing the polyvalent metal salt to the recording medium. The third applicator 4 is configured to apply the pretreatment agent after the application of the aqueous solutions by the first applicator 2 and the second applicator 3. The third applicator 4 includes a pretreatment agent ejection unit 41 and a pretreatment agent storage 42.

The pretreatment agent ejection unit 41 may be a liquid ejection head having an ink-jet nozzle line. However, the present disclosure is not limited thereto, and the pretreatment agent ejection unit 41 may be any unit as long as the pretreatment agent is ejected to a printing area of the recording medium.

The pretreatment agent storage 42 contains the pretreatment agent containing the polyvalent metal salt. In the pretreatment agent storage 42, a pretreatment agent storage container such as a cartridge or a tank is connected to the pretreatment agent ejection unit 41 via a supply tube.

The third applicator 4 may apply the pretreatment agent to the recording medium while the aqueous solution containing the chelating agent applied by the second applicator 3 is wet. The third applicator 4 may apply the pretreatment agent to the recording medium while the aqueous solution is wet, for example, by not performing the drying treatment. Further, the third applicator 4 may apply the pretreatment agent to the recording medium while the aqueous solution is wet, for example, by applying the pretreatment agent before a predetermined time elapses from the application of the aqueous solution by the second applicator 3. The predetermined time may be set as appropriate, and is, for example, 1 to 60 seconds.

When the third applicator 4 is configured to apply the pretreatment agent to the recording medium while the aqueous solution containing the chelating agent is wet, for example, the pretreatment agent is applied to the recording medium in a state where the aqueous solution containing the chelating agent and the aqueous solution containing the alginate are uniformly applied, so that gelation is suppressed uniformly. In addition, bleeding of the pretreatment agent may be reduced.

In the controller, a central processing unit (CPU), a read only memory (ROM), a random access memory (RAM), an input-interface, and an output-interface are electrically connected via a bus.

The CPU performs various operations and processes on the basis of, for example, signals input by a display device, an operation panel, a button, or the like configured to receive input from a user and various programs and data in a ROM and a RAM. Then, data and the like are sent to components such as the first applicator 2, the second applicator 3, the third applicator 4, and the like via the output interface. The RAM is a volatile storage device configured to read and write and store results of the operations and the like obtained in the CPU.

The pretreatment apparatus 1 may further include an ink applicator, for example. The ink applicator is configured to apply the ink to the recording medium applied with the aqueous solution containing the alginate, the aqueous solution containing the chelating agent, and the pretreatment agent containing the polyvalent metal salt by the first applicator 2, the second applicator 3, and the third applicator 4.

The mechanism of reducing the trace of the pretreatment caused by the reaction between the pre-pretreatment agent (PPT) and the pretreatment agent (PT) (hereinafter, also referred to as "gelation trace") according to the present disclosure is presumed as follows, for example. In other words, as described above, the inventors have found that, when an aqueous solution containing alginate is used as the PPT, alginate contained in the PPT and calcium ion contained in the PT are gelated, and thus a trace of gelation is left even outside the printing area. On the other hand, according to the present disclosure, it is presumed that the chelating agent may recover calcium ion bound to alginate, and thus gelation caused by binding between calcium ion and alginate is suppressed. However, the present disclosure is not limited to the above presumption.

Pretreatment Method

A pretreatment method of the present disclosure is described below.

Figure 2:
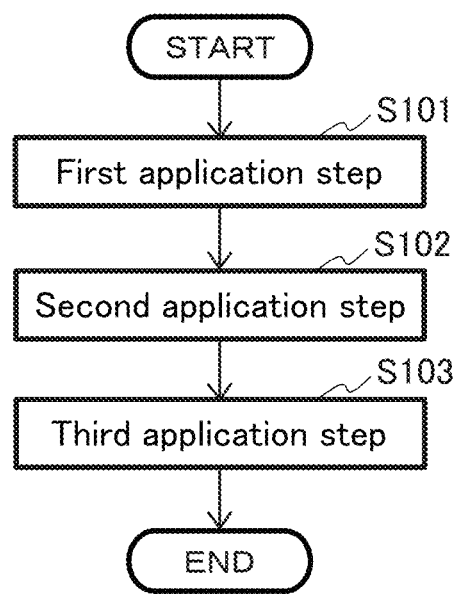
FIG. 2 is a flowchart illustrating an example of processing in a pretreatment method according to the first embodiment.

The pretreatment method of the present embodiment is described below with reference to FIG. 2. FIG. 2 is a flowchart showing an example of the pretreatment method. The pretreatment method of the present embodiment may be performed, for example, using the pretreatment apparatus 1 as follows. However, the pretreatment method of the present embodiment is not limited to the use of the pretreatment apparatus 1.

The first application step (S101) is performed by the first applicator 2. In the first application step (S101), an aqueous solution containing alginate is applied to the recording medium.

In the first application step (S101), for example, the aqueous solution containing the alginate may be applied on the recording medium as a whole or may be applied on the printing area of the recording medium. In addition, in the application of the pretreatment agent (PT) in the third application step (S103) to be described below, from the viewpoint of further suppressing the bleeding of the PT, a pre-pretreatment agent (PPT), in other words, the aqueous solution containing the alginate and the aqueous solution containing the chelating agent, may be applied to the recording medium as a whole in the first application step (S101) and the second application step (S102) to be described below.

The amount of the aqueous solution containing the alginate applied to the recording medium is not particularly limited, and may be, for example, 5 mg/cm$^2$ to 50 mg/cm$^2$. In addition, in the application of the pretreatment agent (PT) in the third application step (S103) described below, from the viewpoint of further suppressing the bleeding of the PT, the pre-pretreatment agent (PPT), in other words, the aqueous solution containing the alginate and the aqueous solution containing the chelating agent, may be in a wet state to such an extent that the recording medium is immersed in the first application step (S101) and the second application step (S102) described below.

Next, the second application step (S102) is performed by the second applicator 3. In the second application step (S102), an aqueous solution containing a chelating agent is applied to the recording medium.

In the second application step (S102), for example, the aqueous solution containing the chelating agent may be applied to the recording medium as a whole or may be applied to the printing area of the recording medium.

The amount of the aqueous solution containing the chelating agent applied to the recording medium is not particularly limited, and may be, for example, 5 mg/cm$^2$ to 50 mg/cm$^2$.

Next, the third application step (S103) is performed by the third applicator 4. In the third application step (S103), a pretreatment agent containing a polyvalent metallic salt is applied to the recording medium.

In the third application step (S103), for example, the pretreatment agent may be applied to the printing area of the recording medium.

The amount of the pretreatment agent applied to the recording medium is not particularly limited, and may be, for example, 1 mg/cm$^2$ to 32 mg/cm$^2$.

In the third application step (S103), the pretreatment agent may be applied while the aqueous solution containing the chelating agent applied in the second application step (S102) is wet. In the case of applying the pretreatment agent while the aqueous solution containing the chelating agent is wet, the interval time between the second application step (S102) and the third application step (S103) may be the predetermined time.

For example, the pretreatment method of the present embodiment may further include an ink application step after the third application step (S103). In the ink application step, the ink is applied to the recording medium.

In FIG. 1, the second application step (S102) is performed after the first application step (S101), but the present disclosure is not limited thereto, and for example, the first application step (S101) may also serve as the second application step (S102) (S101'), and an aqueous solution containing the alginate and the chelating agent may be applied to the recording medium in the first application step (S101').

Producing Method

A method for producing a recording medium applied with the pretreatment of the present disclosure is described below.

The producing method of the present disclosure is a method for producing a recording medium applied with pretreatment, including: a pretreatment step of performing pretreatment on the recording medium, wherein the pretreatment step is performed by the pretreatment method according to the present disclosure, and other is not particularly limited.

The producing method of the present disclosure may be performed, for example, using the pretreatment apparatus 1.

However, the producing method of the present embodiment is not limited to the use of the pretreatment apparatus 1.

The producing method of the present disclosure may further include, for example, an ink application step after the pretreatment step. The ink application step is the same as the ink application step in the pretreatment method of the present disclosure.

Aqueous Solution

The aqueous solution of the present disclosure is an aqueous solution containing alginate, and further containing a chelating agent. Regarding the aqueous solution containing the alginate, the chelating agent, the pretreatment agent containing the polyvalent metal salt, and the pretreatment apparatus, reference may be made to the descriptions as to the pretreatment apparatus 1 and the pretreatment method.

The aqueous solution of the present disclosure may be used, for example, as the aqueous solution containing the alginate and the chelating agent in the pretreatment apparatus 1 and the pretreatment method of the present disclosure. However, the kit of the present embodiment is not limited to the use in the pretreatment apparatus 1 and the pretreatment method of the present disclosure.

Kit

Next, a kit according to the present disclosure including an aqueous solution for use in performing pretreatment on a recording medium having permeability and to be applied with ink, is described below.

The kit of the present disclosure includes a first aqueous solution containing alginate, a second aqueous solution containing a chelating agent, and a pretreatment agent containing a polyvalent metal salt. In the use of the kit of the present disclosure, in order of the first aqueous solution and the second aqueous solution, the pretreatment agent, and the ink are applied to the recording medium.

The kit of the present disclosure may be used, for example, as the aqueous solution containing the alginate, the aqueous solution containing the chelating agent, and the pretreatment agent containing the polyvalent metal salt in the pretreatment apparatus 1 and the pretreatment method of the present disclosure. However, the kit of the present embodiment is not limited to the use in the pretreatment apparatus 1 and the pretreatment method of the present disclosure.

In the kit of the present disclosure, for example, the first aqueous solution may also serve as the second aqueous solution, and the first aqueous solution may contain the alginate and the chelating agent.

The kit of the present disclosure may further contain, for example, the ink.

EXAMPLES

Next, examples of the present disclosure are described together with comparative examples. The present disclosure is not limited to the following examples and comparative examples.

Example 1

It was examined that the range of the gelation trace was reduced by using an aqueous solution containing sodium alginate and a chelating agent as a pre-pretreatment agent (PPT).

Pre-Pretreatment Agent

As the PPT, aqueous solutions (PPT1 to PPT4) of the compositions summarized in Table 1 were prepared. PPT1 is a comparative PPT containing no chelating agent.

TABLE 1

|  | Sodium alginate concentration | Chelating agent concentration |
|---|---|---|
| PPT1 (comparative example) | Alginate Na 1% | — |
| PPT2 | Alginate Na 1% | EDTA4Na4 hydrate 1% |
| PPT3 | Alginate Na 1% | 3Na2 citrate hydrate 1% |
| PPT4 | Alginate Na 1% | 3Na2 citrate hydrate 3% |

Pretreatment Agent

An aqueous solution containing calcium nitrate dihydrate was prepared as a pretreatment agent (PT).

Ink

As the ink, a white ink for use in a commercially available ink-jet printer was used.

Fabric

As a fabric as a recording medium, a commercially available T-shirt (made of polyester, light blue) was used.

Printing

First, the PPT was applied to the fabric as a whole by an operator using a spray (commercially available). The amount of the PPT applied was 67 mg/cm$^2$.

The PT was then ejected onto a printing area using a general ink-jet printer. The printing area was a Kanji character shown in FIGS. 3A and 3B to be described below.

Next, the ink was ejected onto the printing area using a general ink-jet printer.

Next, the ink was fixed using a general oven at 110° C. for 10 minutes.

The procedure from the application of the PPT to the drying by the fixing was performed in a wet state. The wet state was visually examined by an operator that the PPT, the PT, and the ink were not dry.

Examination of Gelation Trace

With respect to the fabric after the fixing, the range and the thickness of the gelation trace outside the printing area were visually examined.

Figure 3A:
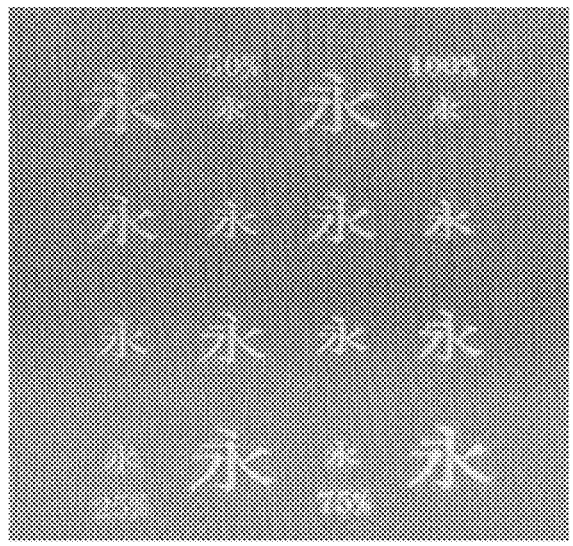
FIGS. 3A and 3B show photographs of fabrics in Example 1.
Figure 3A:
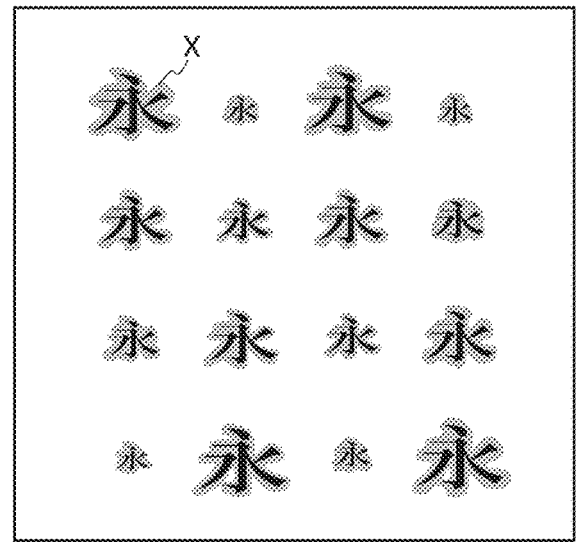
Figure 3A:
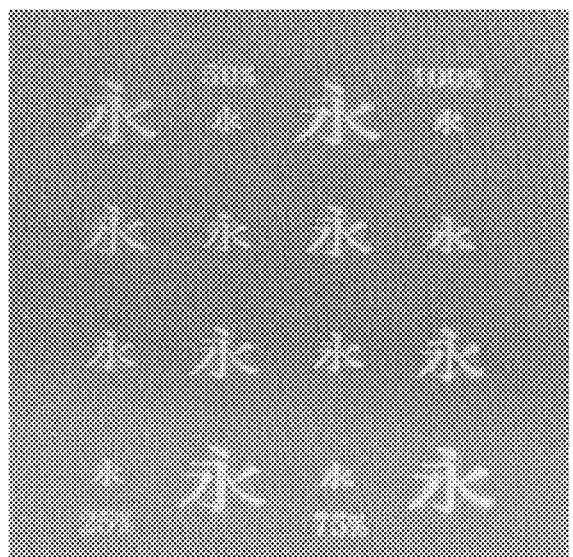
Figure 3A:
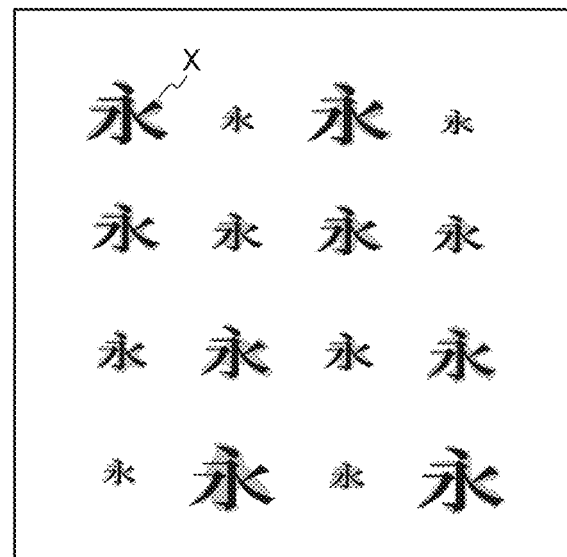
Figure 3B:
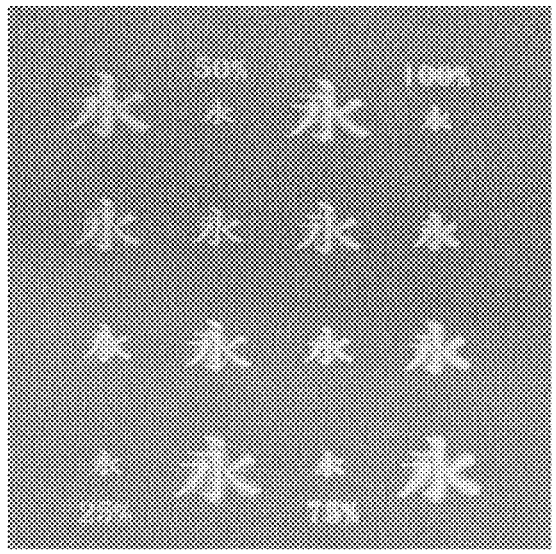
Figure 3B:
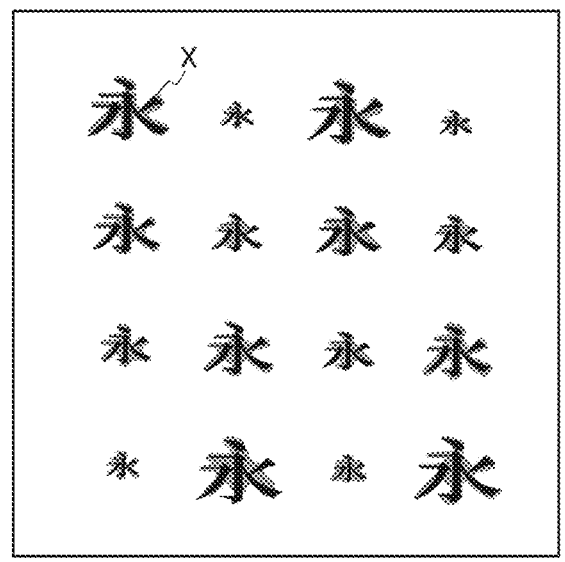
Figure 3B:
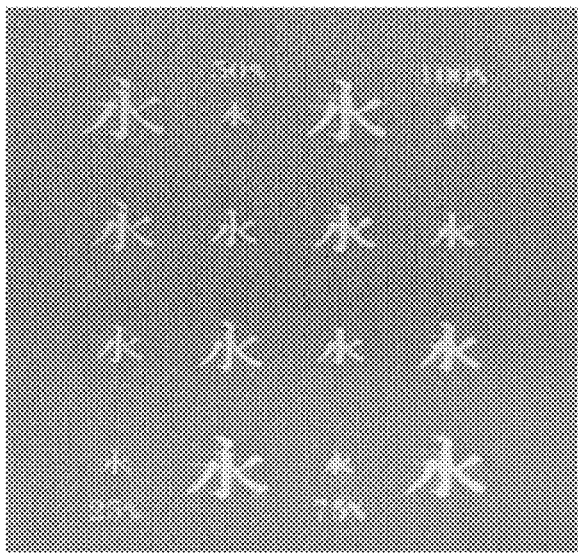
Figure 3B:
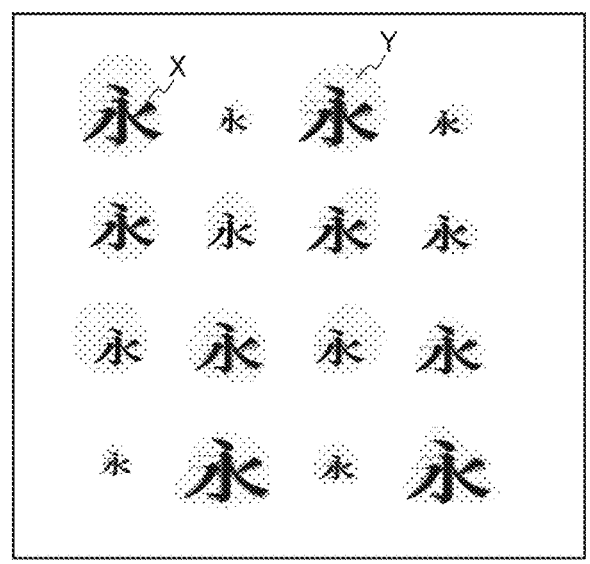

The results are shown in FIGS. 3A and 3B and Table 2. (A) to (D) of FIGS. 3A and 3B are photographs of the fabrics when PPT1 to 4 are applied as a pre-pretreatment agent (PPT), respectively. In each view, the left is the photograph and the right is a schematic diagram showing the state of the photograph. In each of the schematic diagrams (A) to (D) of FIGS. 3A and 3B, the range of the gelation trace is indicated with gray (reference sign "X"). Further, in the schematic diagram (D) of FIG. 3B, an area where unevenness such as bleeding occurs is indicated by dots (reference sign "Y"). The results of FIGS. 3A and 3B are summarized in Table 2.

TABLE 2

| PPT | Gelation trace | | Unevenness such as bleeding |
|---|---|---|---|
|  | Range | Thickness |  |
| PPT1 | Wide | — | Not observed |
| PPT2 | Somewhat narrow | Thickness was not increased | Not observed |
| PPT3 | Somewhat narrow | Thickness was increased | Not observed |
| PPT4 | Narrow | Almost no trace | Observed |

As shown in (A) of FIG. 3A, when the comparative PPT1 was applied as the PPT, gelation traces were generally seen around the characters. On the other hand, as shown in (B) of FIG. 3A, the thickness of the gelation trace when the PPT2 was applied as the PPT was equivalent to the thickness of the gelation trace when the PPT1 was applied as the PPT, but the range of the gelation trace when the PPT2 was applied as the PPT was reduced as compared to the range of the gelation trace when the PPT1 was applied as the PPT. As shown in (C) of FIG. 3B, when the PPT3 was applied as the PPT, the range of the gelation trace was narrower than when the PPT1 was applied. On the other hand, the thickness of the gelation trace was increased. As shown in (D) of FIG. 3B, when the PPT3 was applied as the PPT, the range of the gelation trace was significantly narrower than when the PPT1 was applied. On the other hand, in addition to the gelation trace, unevenness such as bleeding occurred.

As described above, it was examined that the range of the gelation trace was reduced by using the aqueous solution containing sodium alginate and a chelating agent as the PPT as compared with the case where the aqueous solution containing sodium alginate alone was used as the PPT.

When the PPT containing EDTA4Na4 hydrate is used as the chelating agent, the range of the gelation trace was reduced, the thickness of the gelation trace was not increased, and the unevenness such as bleeding did not occur.

Example 2

The trace of the PPT itself was examined by applying the PPT.

As the PPT, aqueous solutions (PPT5 to PPT9) of the compositions summarized in Table 3 were prepared. Note that PPT5 to PPT7 are aqueous solutions of the same composition as PPT1 to PPT3 in Example 1.

TABLE 3

| | Sodium alginate concentration | Chelating agent concentration |
|---|---|---|
| PPT5 (comparative example) | Alginate Na 1% | — |
| PPT6 | Alginate Na 1% | EDTA4Na4 hydrate 1% |
| PPT7 | Alginate Na 1% | 3Na2 citrate hydrate 1% |
| PPT8 | Alginate Na 1% | EDTA4Na4 hydrate 5% |
| PPT9 | Alginate Na 1% | 3Na2 citrate hydrate 5% |

The same fabric as in Example 1 was used.

PPT Application

First, the PPT was dropped onto the fabric as a whole by an operator by using a dropper (commercially available).

Next, the PPT was fixed at 110° C. for 10 minutes in the same manner as in Example 1.

Examination of Trace

For the fabric after the fixing, the state of the PPT trace was visually examined.

Figure 4:
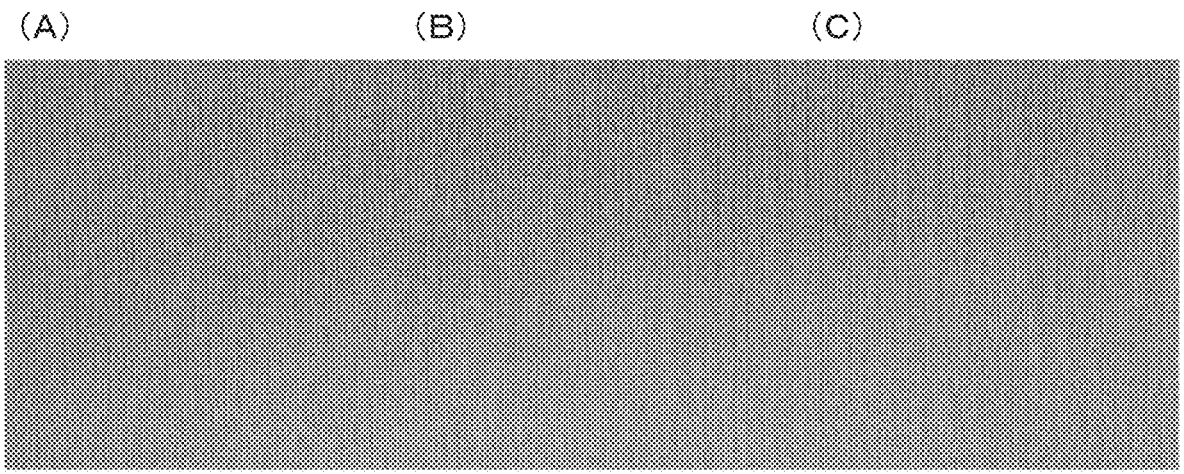
FIG. 4 shows photographs of fabrics in Example 2.
Figure 4:
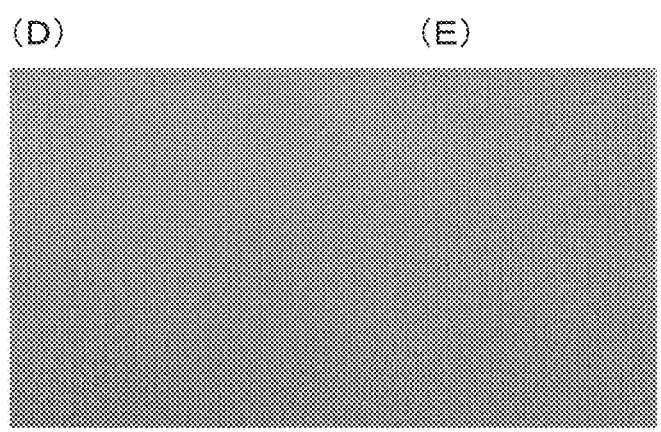
Figure 4:
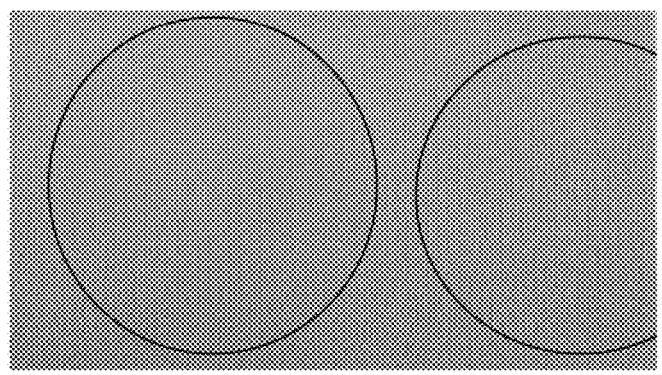

The results are shown in FIG. 4 and Table 4. FIG. 4 shows photographs of the fabric when the PPT5 to PPT9 are applied, wherein (A) shows the result of the PPT5, (B) shows the result of the PPT6, (C) shows the result of the PPT7, (D) shows the result of the PPT8, and (E) shows the result of the PPT9. In (D) and (E) of FIG. 4, the upper photograph shows the fabric applied with the PPT8 and the PPT9, and the lower photograph shows the range where the PPT trace was observed indicated by a line, the inside of the line being a range where the PPT trace was observed. The results of FIG. 4 are summarized in Table 4.

TABLE 4

| PPT | PPT trace |
|---|---|
| PPT5 | Not observed |
| PPT6 | Not observed |
| PPT7 | Not observed |
| PPT8 | Observed |
| PPT9 | Observed |

As shown in (A) to (C) of FIG. 4, the PPT trace was not observed when the PPT5 to the PPT7 were applied as the PPT. On the other hand, as shown in (D) and (E) of FIG. 3B, the PPT trace was slightly observed when the PPT8 and the PPT9 were applied as the PPT.

As described above, when the PPT having a chelating agent concentration of 1% or less was applied, the PPT trace was not observed irrespective of the type of the chelating agent, and when the PPT having a chelating agent concentration of 5% was applied, the PPT trace was slightly observed.

Since it is considered that the trace of the PPT itself become thicker when the chelating agent concentration is more than 5%, the PPT having a chelating agent concentration of 5% or less is used, for example. In addition, the PPT having a chelating agent concentration of 1% or less is used, for example, because the PPT trace is not left.

What is claimed is:

1. A pretreatment apparatus configured to perform pretreatment on a recording medium having permeability and to be applied with ink, comprising:
    a first applicator configured to apply an aqueous solution containing alginate to the recording medium;
    a second applicator configured to apply an aqueous solution containing a chelating agent to the recording medium; and
    a third applicator configured to apply a pretreatment agent containing a polyvalent metal salt to the recording medium, wherein
    the third applicator is configured to apply the pretreatment agent after the application of the aqueous solutions by the first applicator and the second applicator;
    wherein the third applicator is configured to apply the pretreatment agent while the aqueous solution containing the chelating agent applied by the second applicator is wet.

2. The pretreatment apparatus according to claim 1, wherein
    the second applicator is configured to apply the aqueous solution having a chelating agent concentration of 5% or less.

3. The pretreatment apparatus according to claim 1, wherein
    the second applicator is configured to apply the aqueous solution having a chelating agent concentration of 1% or more.

4. The pretreatment apparatus according to claim 1, wherein
    the second applicator is configured to apply the aqueous solution containing EDTA4Na4 hydrate as the chelating agent.

5. The pretreatment apparatus according to claim 1, wherein
    the first applicator also serves as the second applicator, and the first applicator is configured to apply an aqueous solution containing alginate and a chelating agent to the recording medium.

6. A pretreatment method for performing pretreatment on a recording medium having permeability and to be applied with ink, comprising:
- a first application step of applying an aqueous solution containing alginate to the recording medium;
- a second application step of applying an aqueous solution containing a chelating agent to the recording medium; and
- a third application step of applying a pretreatment agent containing a polyvalent metal salt to the recording medium, wherein
- the pretreatment agent is applied by the third application step after the application of the aqueous solutions by the first application step and the second application step;
- wherein a third applicator is configured to apply the pretreatment agent while the aqueous solution containing the chelating agent applied by a second applicator is wet.

7. A method for producing a recording medium applied with pretreatment, comprising:
- a pretreatment step of performing pretreatment on the recording medium, wherein the pretreatment step is performed by a pretreatment method for performing pretreatment on a recording medium having permeability and to be applied with ink, comprising:
  - a first application step of applying an aqueous solution containing alginate to the recording medium;
  - a second application step of applying an aqueous solution containing a chelating agent to the recording medium; and
  - a third application step of applying a pretreatment agent containing a polyvalent metal salt to the recording medium, wherein
  - the pretreatment agent is applied by the third application step after the application of the aqueous solutions by the first application step and the second application step;
  - wherein a third applicator is configured to apply the pretreatment agent while the aqueous solution containing the chelating agent applied by a second applicator is wet.

* * * * *